United States Patent
Lee et al.

(10) Patent No.: US 10,271,482 B2
(45) Date of Patent: Apr. 30, 2019

(54) PROTECTIVE SHEATH FOR CUTTING BLADE ASSEMBY

(71) Applicant: ECHO INCORPORATED, Lake Zurich, IL (US)

(72) Inventors: Eric Kar Wai Lee, Mundelein, IL (US); Jacob Dean Myers, Elgin, IL (US)

(73) Assignee: ECHO INCORPORATED, Lake Zurich, IL (US)

( * ) Notice: Subject to any disclaimer, the term of this patent is extended or adjusted under 35 U.S.C. 154(b) by 47 days.

(21) Appl. No.: 15/656,160

(22) Filed: Jul. 21, 2017

(65) Prior Publication Data

US 2019/0021235 A1    Jan. 24, 2019

(51) Int. Cl.
*A01G 3/053*    (2006.01)
*A01G 3/06*    (2006.01)
*A01G 3/047*    (2006.01)

(52) U.S. Cl.
CPC .............. *A01G 3/053* (2013.01); *A01G 3/047* (2013.01); *A01G 3/06* (2013.01)

(58) Field of Classification Search
CPC ........... A01G 3/053; A01G 3/047; A01G 3/06
USPC ......................................... 30/123, 131, 151
See application file for complete search history.

(56) References Cited

U.S. PATENT DOCUMENTS

| | | | | |
|---|---|---|---|---|
| 3,042,087 A * | 7/1962 | Otoupalik | .............. | B23Q 13/00 30/151 |
| 3,177,582 A * | 4/1965 | Curtis | ..................... | B26B 21/40 30/540 |
| D210,713 S * | 4/1968 | Hamill | ........................... | 30/539 |
| D226,642 S * | 4/1973 | Ferrier | ........................... | 30/539 |
| 4,949,457 A * | 8/1990 | Burout, III | ............... | B25G 1/10 16/110.1 |
| 6,298,558 B1 * | 10/2001 | Tseng | .................... | B26B 21/443 30/41 |
| 7,757,405 B2 * | 7/2010 | Peterson | ................ | A01G 3/053 30/216 |
| 7,934,318 B2 * | 5/2011 | Sowell | ................... | A01G 3/062 30/124 |
| 8,042,275 B2 * | 10/2011 | Sergyeyenko | ......... | A01G 3/053 30/131 |

FOREIGN PATENT DOCUMENTS

EP    0 736 245 A1 * 10/1996

* cited by examiner

*Primary Examiner* — Hwei-Siu C Payer
(74) *Attorney, Agent, or Firm* — Wood, Phillips, Katz, Clark & Mortimer

(57) ABSTRACT

In combination: a) a cutting blade assembly having a frame and a first cutting blade member with a first cutting edge portion configured to cause relative movement between components on the cutting blade assembly whereby the at least first cutting edge portion effects severance of an object; and b) a protective sheath. The protective sheath can be moved relative to the cutting blade assembly between: a) a first separated position; and b) an assembled position. The protective sheath frictionally engages the cutting blade assembly to thereby be maintained in the assembled position. The protective sheath has at least one component that projects away from the cutting blade assembly and has oppositely facing surfaces that can be grasped between two fingers on a user's one hand to facilitate repositioning of the protective sheath.

19 Claims, 7 Drawing Sheets

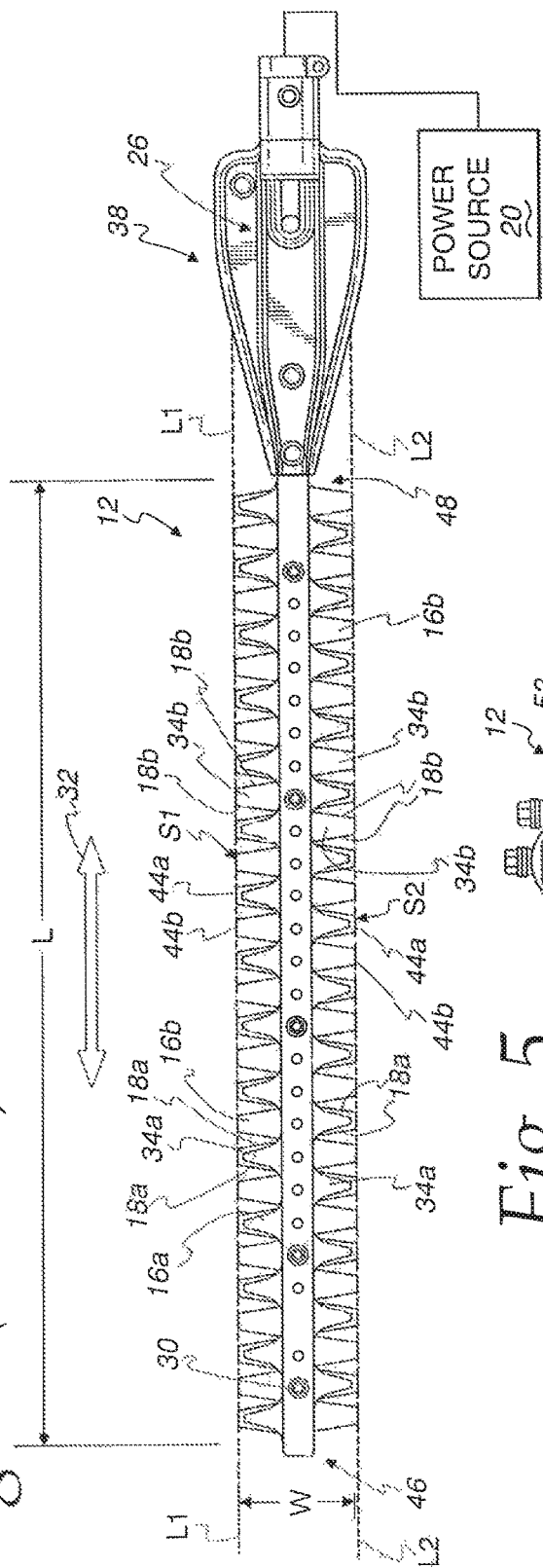
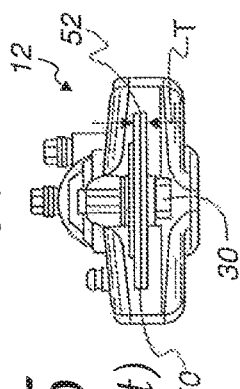
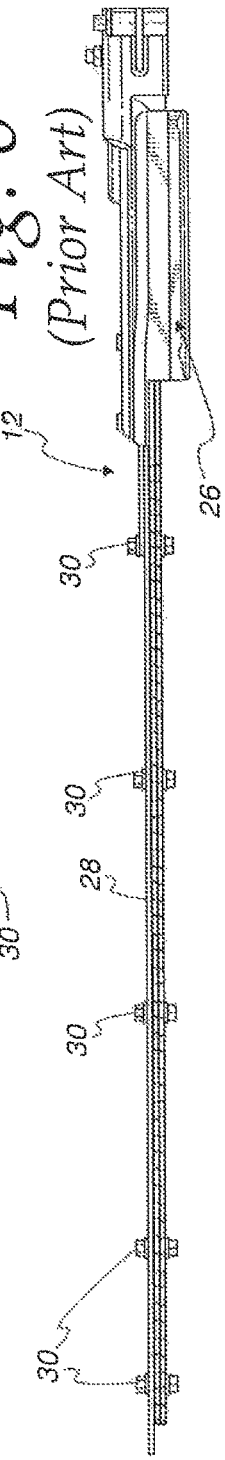
Fig. 4 (Prior Art)
Fig. 5 (Prior Art)
Fig. 6 (Prior Art)

PROTECTIVE SHEATH FOR CUTTING BLADE ASSEMBY

BACKGROUND OF THE INVENTION

Field of the Invention

This invention relates to cutting blade assemblies, as incorporated into hedge trimmers and the like, and, more particularly, to a protective sheath to avoid unwanted exposure to sharp edges on the cutting blade assembly when not in use.

Background Art

One category of vegetation cutting tool has a cutting blade assembly that utilizes one or more reciprocating cutting blade members. In one form, as shown in U.S. Pat. No. 7,757,405, a pair of flat cutting blade members are placed, one on top of the other. Each cutting blade member is elongate with teeth on opposite sides of a lengthwise axis, with each of the teeth having sharpened edge portions. The edge portions of the teeth on the separate cutting blade members cooperate to produce a scissors-type cutting action.

The cutting blade members are operatively mounted on an elongate frame element. One end of the frame element is at the free end of the cutting blade assembly, whereas the other end serves as a support for a transmission unit through which a drive force from a power unit is transferred to the cutting blade members.

Typically, a cutting portion of the cutting blade assembly, as viewed in plan, has a rectangular shape between the free end thereof and the opposite end at which the transmission unit is located. Over that extent, the cutting blade assembly has a substantially uniform thickness with the exception of a center raised area at which location the cutting blade members are secured to the frame element, typically using threaded fasteners.

The edge portions of the teeth are maintained in a sharpened state to effectively cut sometimes relatively thick vegetation. The sharp edge portions are exposed at opposite sides of the cutting blade assembly.

Accordingly, care must be taken in handling vegetation cutting tools of this type during the manufacturing process, as they are transported, and in use. A relatively light contact between the sharp edge portions of the teeth and a user's skin could produce a flesh wound.

To avoid injuries, manufacturers of this category of vegetation cutting tool have routinely provided protective sheaths that are slid lengthwise over the cutting blade assembly thereby to block contact with the sharp edge portions over the full lengthwise extent of the cutting blade assembly.

One exemplary sheath construction has an extruded form which, in cross section orthogonal to the length thereof, has a substantially oval shape, with the major axis extending widthwise of the cutting blade assembly. One of the long sides of the oval shape has a raised rib to accommodate projecting ends of the threaded fasteners that secure the cutting blade members to the frame element. The opposite side has a void which results in the sheath having a cross-sectional "C" shape.

The initial dimensions of the sheath are selected so that the sheath has to be somewhat widened along the minor axis of the oval shape to accommodate the combined thickness of the cutting blade members. As a result, a restoring force in the sheath tends to positively maintain the same in place through frictional gripping forces generated primarily between the sheath and the opposite facing surface of the cutting blade members.

With this construction, a user will commonly engage the sheath by wrapping his/her hand around the width thereof at a lengthwise location. The gripped portion can then be used to manipulate the sheath to align one end thereof with the free end of the cutting blade assembly to initiate assembly onto the cutting blade assembly. By then translating the sheath lengthwise over the cutting blade assembly, it can be abutted to the transmission unit which consistently places the sheath in its assembled position. The user may find it most convenient to regrip the sheath and translate the same in steps to effect this assembly.

One inherent flaw in this basic design is that gripping of the sheath around its width to effect its repositioning naturally tends to reduce the dimension of the oval shape along its minor axis. By tightly gripping the sheath to positively effect its movement, it may become squeezed against the cutting members with a sufficient force that its movement lengthwise of the cutting blade assembly is significantly inhibited. Thus, a greater force must be applied to effect guided sliding of the sheath lengthwise relative to the cutting blade assembly.

While the dimension of the oval shape along the major axis is generally selected to be greater than the width dimension of the cutting blade assembly, while sliding the sheath along the cutting blade assembly, the sheath may also skew which causes additional binding between the opposite sides of the cutting blade assembly and straddling sheath portions.

Another inherent problem with this design is that the normal gripping of the sheath involves wrapping the user's hand around the surrounded cutting blade assembly during removal. Commonly, to generate the most efficient removal force, a person will grasp the sheath adjacent to the end abutted to the transmission unit. In so doing, the person risks contacting the cutting edge portions as they progressively become exposed.

The same problem also potentially occurs as the sheath is initially installed. That is, a person may be inclined to grasp near the sheath end presented to the free end of the cutting blade assembly to effect alignment with the free end of the cutting blade assembly to initiate placement of the sheath. Again, there is a risk that the hand may slip or otherwise unintentionally be brought into contact with the cutting edge portions during this initial alignment and/or as the sheath is pushed in translation.

Slippage of a user's hand is particularly a problem with the common extrusion formation of existing sheaths with a plastic material. The extruded plastic has a smooth external surface that must be grasped. This surface is difficult to grasp, which problem is aggravated when the surface is exposed to moisture or lubricants that may be used to maintain cutting blade assemblies.

In spite of the existence of the above problems for many decades, no commercially feasible design alternatives to those described above have been devised. Instead, the industry has continued to contend with those problems.

SUMMARY OF THE INVENTION

In one form, the invention is directed to the combination of a cutting blade assembly and a protective sheath. The cutting blade assembly has a length and a frame with a first cutting blade member with at least a first cutting edge portion attached to the frame. The cutting blade assembly is configured to cause relative movement between components on the cutting blade assembly that causes the at least first cutting edge portion to effect severance of an object. The cutting blade assembly and protective sheath are configured so that: i) the protective sheath can be moved relative to the cutting blade assembly between: A) a first separated position; and B) an assembled position wherein the protective sheath overlies at least a part of the cutting blade assembly so as to avoid unwanted contact with the at least first cutting edge portion; and ii) the protective sheath frictionally engages the cutting blade assembly to thereby be maintained in the assembled position as an incident of the protective sheath moving from the separated position into the assembled position. The protective sheath has at least one component that projects away from the cutting blade assembly with the protective sheath in the assembled position and has oppositely facing surfaces that can be grasped between two fingers on a user's one hand to facilitate repositioning of the protective sheath with the user's one hand.

In one form, the protective sheath is a single piece formed by an extrusion process.

In one form, the protective sheath has a body with a length. As viewed in cross section, taken transversely to the body length, the body defines an inside surface with a substantially oval shape that grips the cutting blade assembly with the protective sheath in the assembled position.

In one form, the oval shape of the inside surface has a major axis. The oval shape of the inside surface has a lengthwise void to receive a part of the cutting blade assembly.

In one form, the at least one component is an elongate rib.

In one form, the elongate rib has a solid shape between the oppositely facing surfaces.

In one form, the oppositely facing surfaces are defined on first and second wall portions that are spaced from each other.

In one form, the body has spaced third and fourth wall portions that each extend between the first and second wall portions.

In one form, with the cutting blade assembly in the assembled position, the oppositely facing surfaces each has a portion projecting away from the cutting blade assembly at least 1 inch.

In one form, the protective sheath is made from a non-metal material.

In one form, with the body viewed in cross section, taken transversely to the body length, the inside surface has a generally oval shape over substantially a full lengthwise extent of the body.

In one form, the body has spaced lengthwise ends. The void extends fully between the spaced lengthwise ends of the body.

In one form, the protective sheath has a body with a length. As viewed in cross section, taken transversely to the body length, the body has a "T" shape with a cross bar and a stem with a free end.

In one form, the stem has a width. The width of the stem is locally enlarged adjacent the free end of the stem.

In one form, the oppositely facing surfaces are on the stem and diverge in a direction from the stem free end towards the cross bar.

In one form, the protective sheath has two different materials formed by a co-extrusion process. At least one of the different materials is exposed to be engaged by a user grasping the oppositely facing surfaces.

In one form, the cutting blade assembly has a cutting portion with a free end and an opposite end spaced in a lengthwise direction. Spaced sides define a part of a perimeter shape of the cutting blade assembly approximated by first and second substantially parallel lines spaced from each other a first distance. The inside surface of the body compressibly grips the cutting blade assembly with the protective sheath in an assembled position.

In one form, the cutting blade assembly has a second cutting blade member with at least a second cutting edge portion. The cutting edge portions on the first and second cutting blade members cooperate to produce a scissors-type cutting action as at least one of the first and second cutting blade members is moved in a predetermined manner.

In one form, the above structure is provided in combination with a power source for moving the at least one of the first and second cutting blade members in the predetermined manner.

In one form, the cutting blade assembly has a transmission unit for transmitting an operating force from the power source to the at least one of the first and second cutting blade members.

BRIEF DESCRIPTION OF THE DRAWINGS

FIG. 4 is a top view of the cutting blade assembly in FIG. 3 in an assembled state;

FIG. 5 is an end elevation view of the cutting blade assembly in FIG. 4;

FIG. 6 is a side elevation view of the cutting blade assembly in FIGS. 4 and 5;

DETAILED DESCRIPTION OF THE PREFERRED EMBODIMENT

Figure 1:
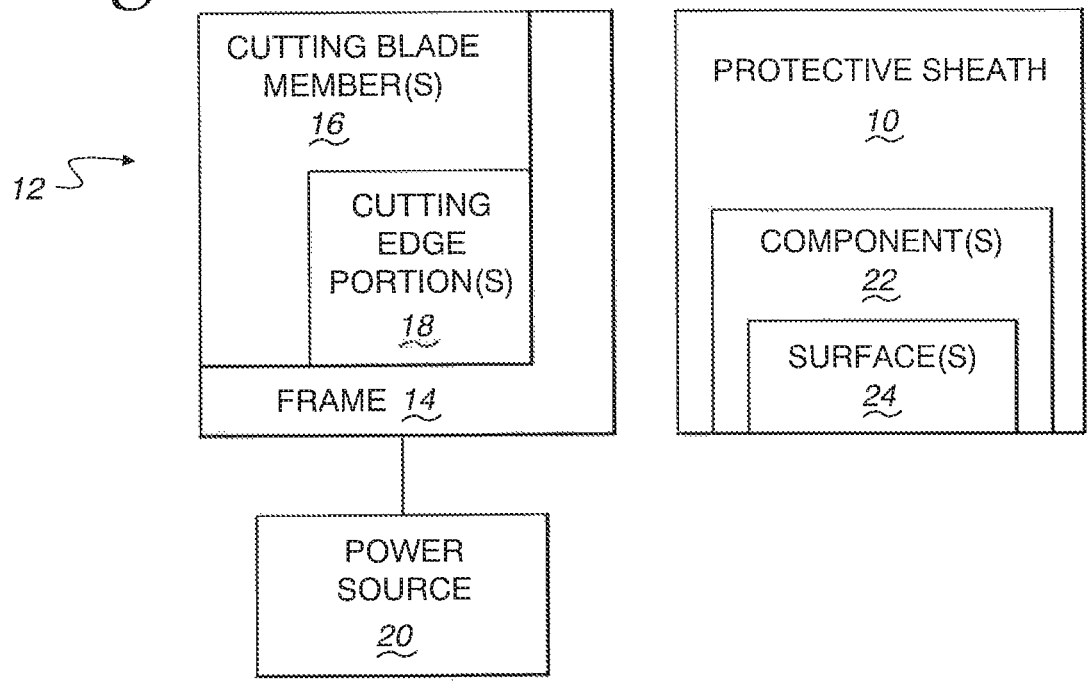
FIG. 1 is a schematic representation of a powered tool having a cutting blade assembly thereon to which a protective sheath, according to the present invention, is removably assembled.
Figure 2:
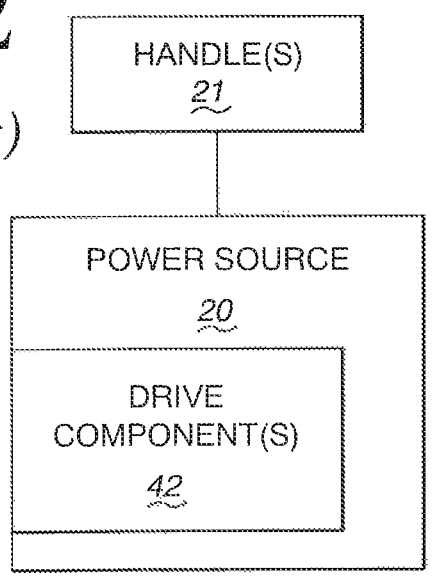
FIG. 2 is a schematic representation of further details of a conventional power unit for the cutting blade assembly as shown in FIG. 1.
Figure 3:
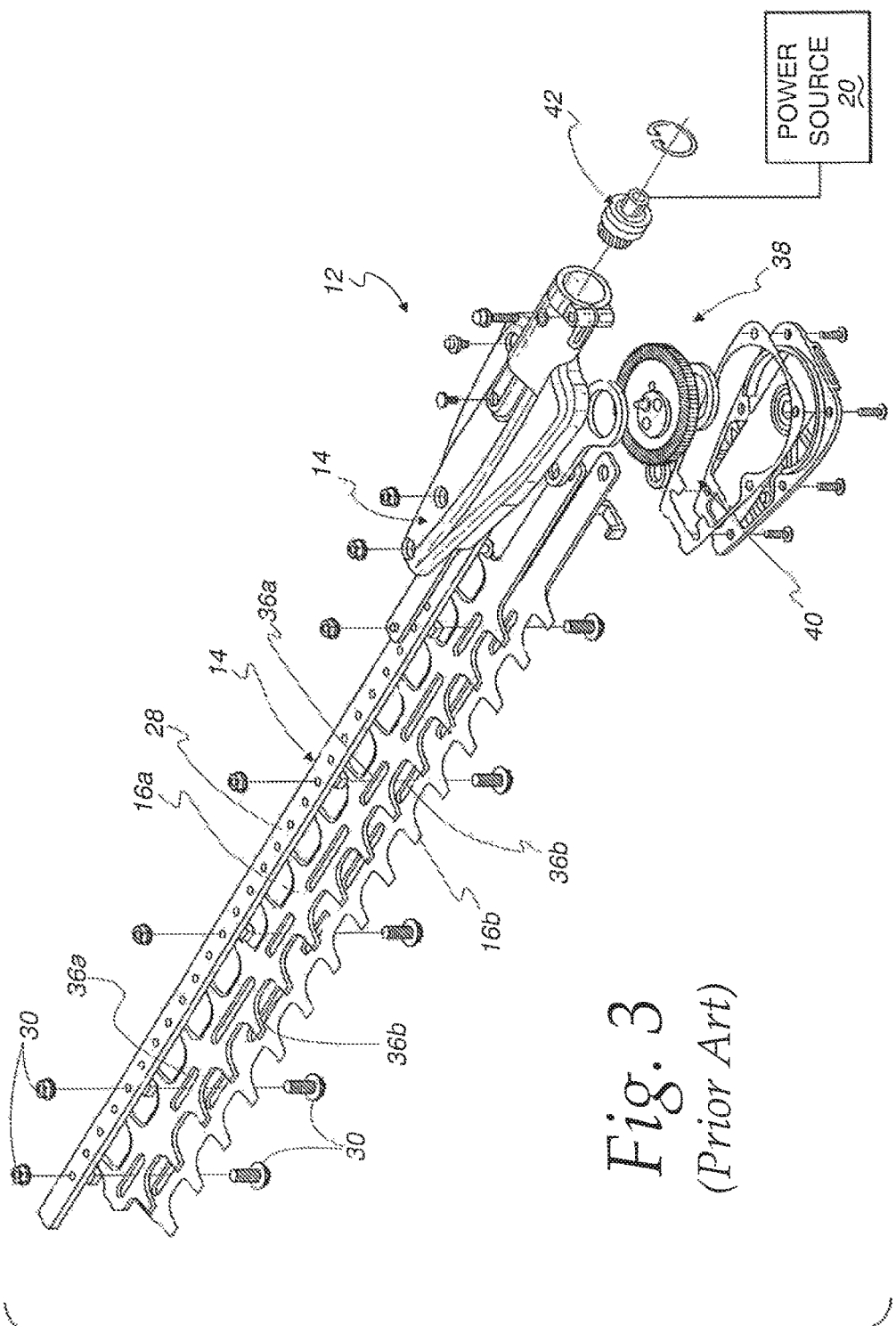
FIG. 3 is an exploded perspective view of one exemplary form of a conventional cutting blade assembly, as shown schematically in FIG. 1.

As shown schematically in FIGS. 1 and 2, the invention is directed to a protective sheath 10 for a cutting blade assembly at 12. The cutting blade assembly 12 has an elongate configuration and includes a frame 14 with at least one cutting blade member 16 thereon. Each cutting blade member 16 has at least one cutting edge portion 18.

The cutting blade assembly 12 is designed to be operated by a power source 20 with one or more handles 21 to facilitate controlled positioning of a tool made up of the power source 20 and cutting blade assembly 12. The power source 20 is operated to cause relative movement between at least two components on the cutting blade assembly 12 that causes the cutting edge portion(s) 18 to effect severance of an object, such as vegetation.

The protective sheath 10 and cutting blade assembly 12 are configured so that: i) the protective sheath 10 can be moved relative to the cutting blade assembly 12 between: A) a first separated position; and B) an assembled position wherein the protective sheath 10 overlies at least a part of the cutting blade assembly 12 so as to avoid unwanted contact with the cutting edge portion(s) 18; and ii) the protective sheath frictionally engages the cutting blade assembly 12 to thereby be maintained in the assembled position as an incident of the protective sheath 10 moving from the separated position into the assembled position.

The protective sheath 10 has at least one component 22, integrally formed or joined, that projects away from the cutting blade assembly 12 with the protective sheath 10 in the assembled position. The component 22 has oppositely facing surfaces 24 that can be grasped, as between two fingers on a user's one hand, to facilitate repositioning of the protective sheath 10 with the user's one hand.

The cutting blade assembly 12 and power source 20 are shown schematically to encompass virtually an unlimited number of different configurations of apparatus with which the protective sheath 10 can be utilized. The cutting blade assembly 12 generally is contemplated to be a mechanism that effects severance of an object through the cutting edge portion(s) 18 as an incident of two components that make up the cutting blade assembly 12 being moved relative to each other so as to bear the cutting edge portion(s) 18 against the particular object. "Object" is intended to encompass different forms, among which is vegetation that is commonly trimmed using this type of mechanism. The specific exemplary form described herein is generally identified as a hedge trimmer.

Likewise, the protective sheath 10 is shown schematically to encompass virtually an unlimited number of variations thereof, including different component configurations as well as their interactions.

The specific forms of the cutting blade assembly 12 and protective sheath 10, depicted in the drawings herewith and described hereinbelow, are exemplary in nature only. One skilled in the art would be able to use the inventive concepts to make different forms of the protective sheath 10 and different forms of cutting blade assemblies 12.

The frame 14 on the exemplary cutting blade assembly 12, shown in FIGS. 3-6, consists of a housing 26 and an elongate blade support 28 projecting in cantilever fashion from the housing 26.

Two cutting blade members 16a, 16b are operatively mounted upon the blade support 28 through a series of threaded fasteners 30 at spaced intervals along the length of the blade support 28 and cutting blade assembly 12, as indicated by the double-headed arrow 32.

The cutting blade members 16a, 16b have a similar construction, with each formed as from a flat piece of metal stock.

The cutting blade member 16a has a plurality of teeth 34a at spaced intervals along the length of the cutting blade member 16a at opposite sides S1, S2 of the cutting blade assembly 12. Each of the teeth 34a has a pair of cutting edge portions 18a.

The cutting blade member 16b has the same general shape as the cutting blade member 16a but is inverted. Teeth 34b are spaced along the length of the cutting blade assembly 12 at the opposite sides S1, S2. Each of the teeth 34b has cutting edge portions 18b.

The cutting blade members 16a, 16b have slots 36a, 36b, respectively, that are registrable and through which the threaded fasteners 30 extend. This allows the cutting blade members 16a, 16b to be translated guidingly lengthwise relative to each other in predetermined paths so that the cutting edge portions 18a, 18b cooperate to produce a scissors-type cutting action.

While both of the cutting blade members 16a, 16b are configured and operatively mounted to move in reciprocating paths in a predetermined manner, the cutting blade assembly 12 might be constructed so that only one of the cutting blade members 16a, 16b moves relative to the frame 14.

In this embodiment, a transmission unit 38 is operated to synchronize reciprocating movement of the cutting blade members 16a, 16b. The transmission unit 38 includes a mechanism shown generally at 40 in FIG. 3. Forces generated by the power source 20 are imparted to the mechanism 40 through a drive component 42 on the power source 20, shown schematically in FIG. 2 and as an input gear 42 in FIG. 3.

The details of operation of the exemplary cutting blade assembly 12 are not critical to understanding the present invention. Thus, they are only generally described herein. Further details of the operation of the structure in FIGS. 3-6 are set forth in U.S. Pat. No. 7,757,405, commonly assigned herewith. The disclosure in U.S. Pat. No. 7,757,405 is fully incorporated herein by reference.

As seen in FIGS. 4-6, side edges 44a, 44b on the teeth 34 align in substantially straight lines L1, L2 that are substantially parallel over the length L of the cutting portion of the combined cutting blade members 16a, 16b. The space in-between the parallel lines L1, L2 represents the width W of the cutting portion of the cutting blade assembly 12 between a free end 46 and an opposite end 48 adjacent to the transmission unit 38. For purposes of simplicity, the side edges 44a, 44b on the side S1 will be considered to cooperatively make up a side edge 50, with the side edges 44a, 44b at the side S2 cooperatively making up a side edge 52.

The cutting blade members 16a, 16b have a substantially uniform, combined thickness T between the side edges 50, 52 over substantially the entire length L.

Figure 7:
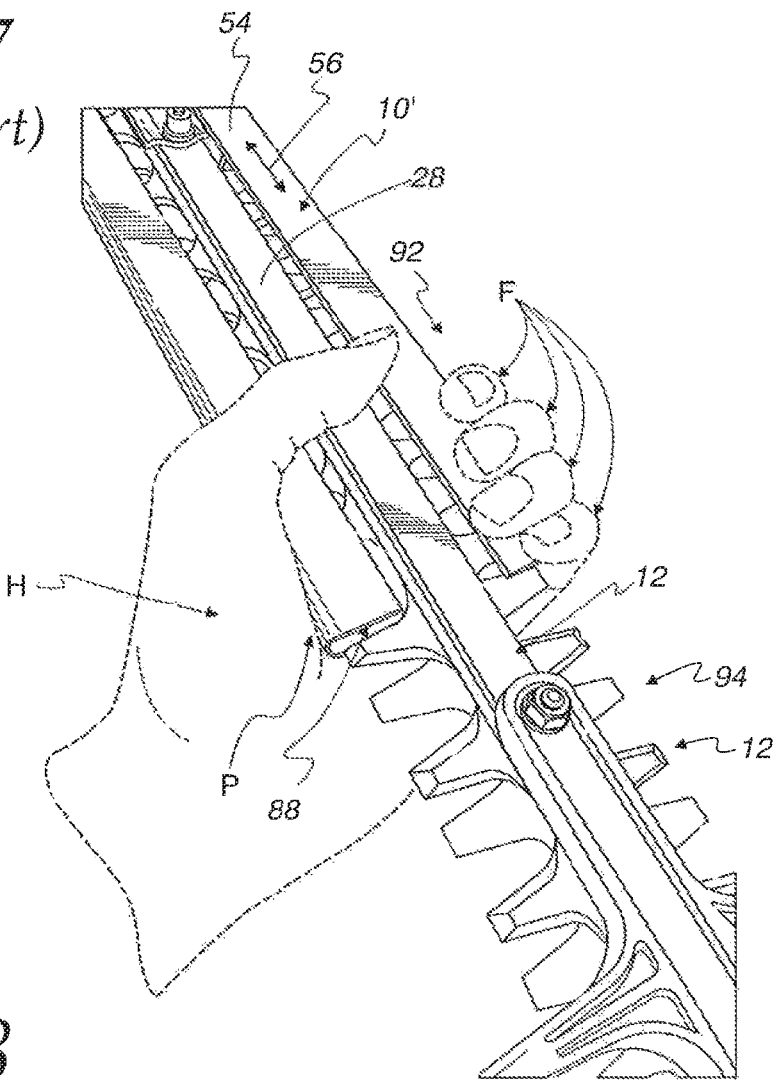
FIG. 7 is a fragmentary perspective view of the cutting blade assembly in FIGS. 3-6 with a conventional protective sheath, partially assembled and being grasped for movement by a user.
Figure 8:
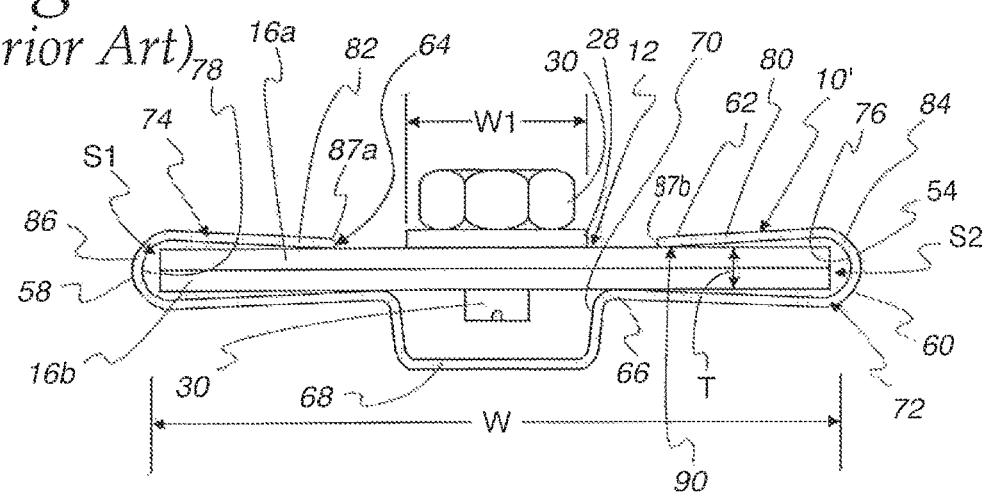
FIG. 8 is an end view of the protective sheath assembled to the cutting blade assembly in FIG. 7.

In FIGS. 7 and 8, a conventional protective sheath 10' is shown in relationship to the cutting blade assembly 12.

The protective sheath 10' has an extruded body 54 with a length, as indicated by the double-headed arrow 56 matched approximately to the length L of the cutting portion of the cutting blade assembly 12.

The body 54, as seen from an end-wise perspective, or in cross section taken transversely to the length thereof, has an overall shape that is obround or oval, with a major axis extending between spaced sides 58, 60. An upper wall 62 of the body 54 has a widthwise void 64 midway between the sides 58, 60 that is greater than the width W1 of the blade support 28.

The bottom wall 66 of the body 54 has an offset region 68 defining a receptacle 70 for portions of the fasteners 30 projecting below the stacked cutting blade members 16a, 16b.

The body 54 is shaped and dimensioned so that U-shaped portions 72, 74, that open towards each other, wrap around the side regions of the cutting blade members 16a, 16b. Generally, the major axis of the oval is significantly greater than the width W of the cutting blade portion.

A captive force is produced by extruding the top legs 80, 82 so that they are slightly angled towards the bottom wall 66 away from their respective bight regions 84, 86. With this arrangement, the legs 80, 82 must be flexed slightly away from the bottom wall 66 to accommodate the thickness T of the combined cutting blade members 16a, 16b.

Accordingly, restoring forces in the deformed body 54 cause the assembled protective sheath 10' to grip the stacked cutting blade members 16a, 16b in a vertical direction between the legs 80, 82 and bottom wall 66. The gripping force is created primarily between the edges 87a, 87b bounding the void 64 and a narrow width of the bottom wall 66 below each edge 87a, 87b, as seen in FIG. 8.

To assemble the protective sheath 10', one free end 88 is aligned with the free end 46 of the cutting blade assembly 12 to allow direction of the cutting portion of the cutting blade assembly 12 into the opening 90 defined by the body, as shown in FIG. 8.

Since the body 54 must be flexed/reconfigured to accommodate the cutting portion of the cutting blade assembly 12, a substantial lengthwise force may have to be applied by a user to overcome the gripping forces between the body 54 and the cutting blade assembly 12. The best leverage to accomplish this is gained by wrapping the user's hand H around the body end 88, as shown in FIG. 7, and through that hand H applying a lengthwise force while maintaining the hand grippingly engaged therewith.

As noted in the Background Art portion herein, the extruded plastic body 54 has a relatively smooth surface over which the user's hand H tends to slide. As seen in FIG. 7, if the hand H slides relative to the body 54 as the force thereon is exerted in the direction of the lengthwise arrow 92, the hand H may move against the exposed region of the cutting portion of the cutting blade assembly 12 as shown at 94.

Further, even if the hand H does not slip, it is generally wrapped in a manner that the fingers F and/or palm region P may inadvertently contact the exposed cutting portion of the cutting blade assembly 12.

This problem is aggravated by the fact that the normal grasping position that is assumed, as shown in FIG. 7, causes an increased width of the bottom wall 66 to be borne against the cutting blade member 16b and causes the edges 87a, 87b to bear more positively against the cutting blade member 16a. This increases the resistance to guided sliding movement of the body 54 over the cutting portion of the cutting blade assembly 12. Skewing of the lengthwise alignment of the body 54 and the cutting blade assembly 12 may cause the body 54 to engage the sides S1, S2 of the cutting blade assembly 12 which creates further resistance to relative movement of the body 54 and cutting blade assembly 12. Thus, a greater force must be applied which in turn increases the likelihood that the hand H might slip.

Figure 9:
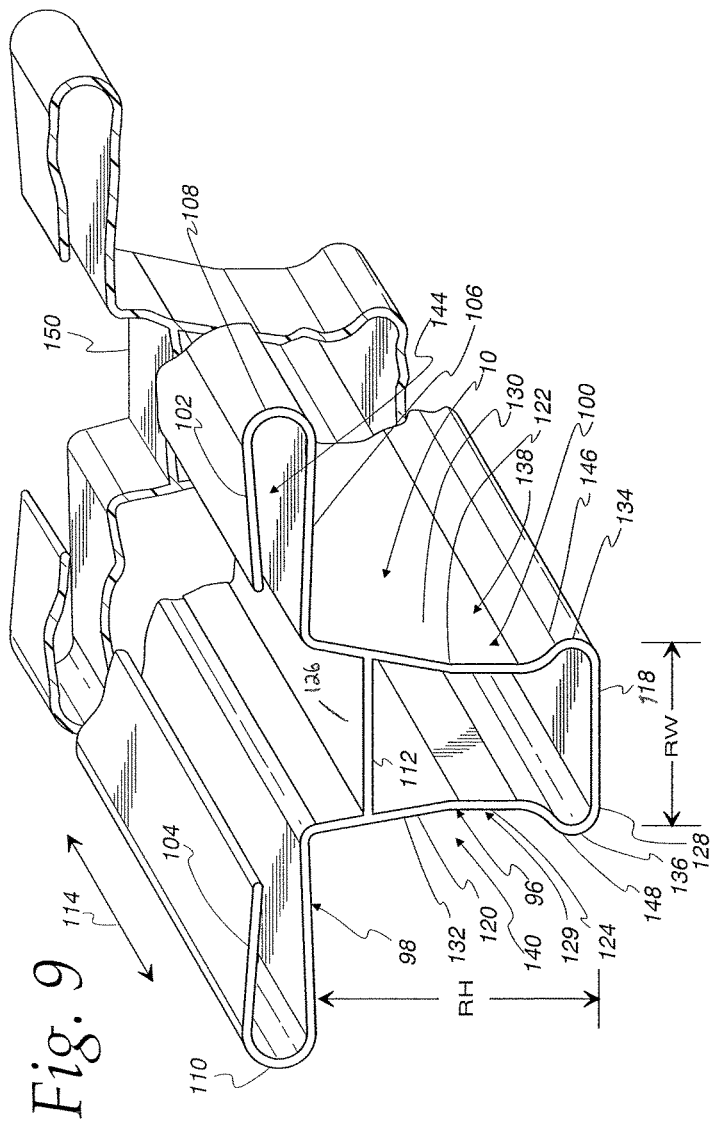
FIG. 9 is a fragmentary, perspective view of one form of protective sheath, according to the invention.
Figure 10:
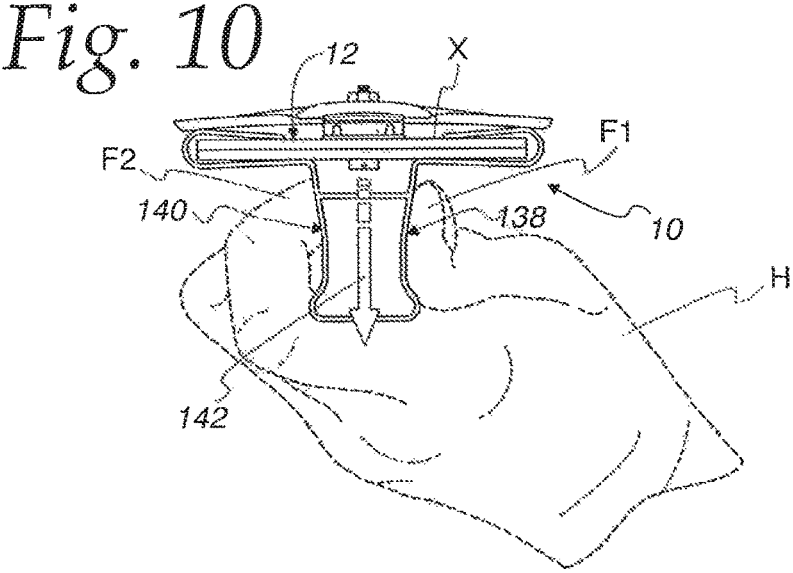
FIG. 10 is an end elevation view of the protective sheath in FIG. 9 assembled on the cutting blade assembly in FIGS. 2-6 and being grasped by the hand of a user to effect repositioning thereof.
Figure 11:
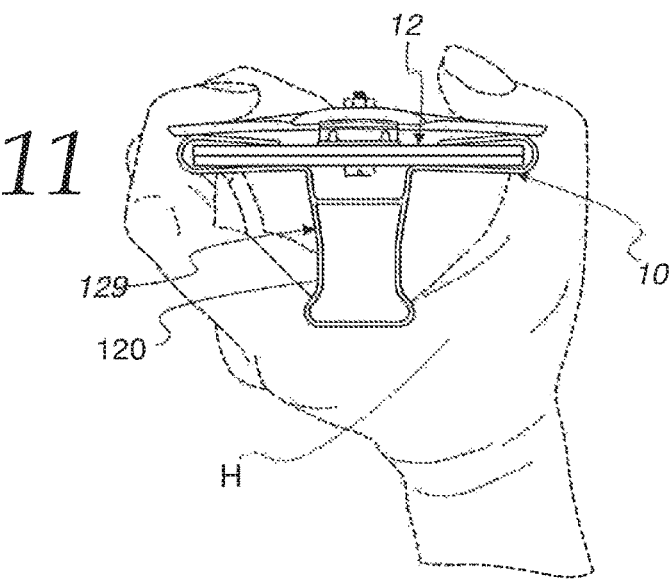
FIG. 11 is a view as in FIG. 10 showing the protective sheath in the FIG. 10 position grasped in an alternative manner.

One form of the protective sheath 10 is shown in FIGS. 9-11. The protective sheath 10 is in a preferred form a single piece formed by an extrusion process with a constant cross-sectional configuration over its entire length. Extrusion processing and one piece formation, while desirable, are not required.

The protective sheath 10 has a body 96 with two distinct portions—an engaging portion 98 and a handling portion 100.

The engaging portion 98 may have the same configuration as the aforementioned body 54. That is, the body 96 has: a) legs 102, 104 corresponding to the legs 80, 82; b) a bottom wall 106 corresponding to the bottom wall 66; c) bight portions 108, 110, corresponding to the bight portions 84, 86; and d) an offset region of the bottom wall at 112 corresponding to the offset region 68.

The engaging portion 98 may have a different configuration, but ideally functions in a manner whereby the engaging portion 98 of the body 96 is frictionally engaged with the cutting portion of the cutting blade assembly 12 with the protective sheath 10 in the assembled position of FIG. 11, wherein the length of the protective sheath 10, as indicated by the double-headed arrow 114 in FIG. 9, extends over at least a substantial portion of the length L of the cutting portion of the cutting blade assembly 12.

From an end perspective, the body portions 98, 100 together define a "T" shape, wherein the legs 102, 104, bight portions 108, 110, and bottom wall 106 define a crossbar, with the offset region 112 and portion 100 defining a stem of the T. The stem terminates at a free end 118.

The stem of the T defines an elongate, graspable rib 120. In this embodiment, the rib 120 is defined by laterally spaced walls/wall portions 122, 124.

A wall/wall portion 126 on the offset region 112 connects between the walls 122, 124. Another wall/wall portion 128 connects between the walls 122, 124 adjacent the free end 118. This wall arrangement produces a relatively rigid rib portion at 129 that can be positively grasped and manipulated to reposition the engaging portion 98.

The walls 122, 124 converge in a direction from the bottom wall 106 towards the free end 118. The walls 122, 124 respectively define graspable surfaces 130, 132 that face laterally oppositely.

The width of the stem/rib portion 100 is locally enlarged adjacent the free end 118 by providing lobes 134, 136 respectively where: a) the wall 122 transitions into the wall 128; and b) the wall 124 transitions into the wall 128.

This configuration produces separate receptacles 138, 140 within which two fingers F1, F2 on a user's hand can be placed to grasp the portion 100 as shown in FIG. 10. The lobes 134, 136 block sliding movement of the hand H, as it is grasping the rib 120, away from the cutting blade assembly, as indicated by the arrow 142.

With the described structure, the rib 120 can be positively grasped and squeezed tightly without significantly altering the configuration of the receptacle 144 defined by the engaging portion 98. At the same time, the rib 120 has substantial rigidity by reason of the closed configuration produced by the cooperating and mutually reinforcing walls/wall portions 122, 124, 126, 128. The converging relationship of the walls 122, 124, together with the curved outer surfaces 146, 148 defined by the lobes 134, 136, comfortably accommodate the user's fingers while allowing a positive grip to be maintained that is not likely to be compromised by slippage.

With this arrangement, the rib 120 can be grasped in a region adjacent to the leading lengthwise end 150 of the protective sheath 10 as it is aligned with the free end 46 of the cutting blade assembly 12. By exerting a lengthwise force, the body 96 is pressed against the cutting blade assembly 12, which thereby reconfigures the body 96 so that the receptacle 144 will accept the cutting blade assembly 12. As noted above, this deformation of the body 96 causes residual forces to compressibly capture the thickness and width of the stacked cutting blade members 16a, 16b so that the protective sheath 10 will be thereby maintained in its assembled position.

Because the user is not required to extend his/her hand around the cutting blade assembly 12, as shown with the conventional protective sheath in FIG. 7, the bight portions 108, 110 are not compressed towards each other as would provide further resistance to sliding movement of the protective sheath 10 along the length of the cutting blade assembly 12. At the same time, the user's hand is not situated in close proximity to the cutting blade assembly 12 or in a position wherein it might slip to contact the cutting blade assembly as the protective sheath 10 is either moved: a) from a separated position into an assembled position; and b) out of the assembled position.

The degree of extension of the rib 120 away from the bottom wall 106 of the body 96, as identified by the dimension RH, is strategically selected. The design focus may be on one or both of two objectives.

First of all, the dimension RH should be adequate that a user cannot comfortably extend his/her hand in a grasping arrangement around the protective sheath and cutting blade assembly 12, as shown in FIG. 11. This will discourage the unintended handling of the protective sheath 10 whereby the aforementioned problems associated with the prior art are contended with.

Additionally, the dimension RH and rib width RW are selected so that the user can comfortably and positively grasp the rib 120 between his/her fingers in the general manner as shown in FIG. 10.

In one preferred form, the dimension RH is at least one inch, and can be significantly greater. The dimension RW is preferably at least ½ inch and likewise can be significantly greater. These are representative dimensions that should not be viewed as limiting.

Figure 12:
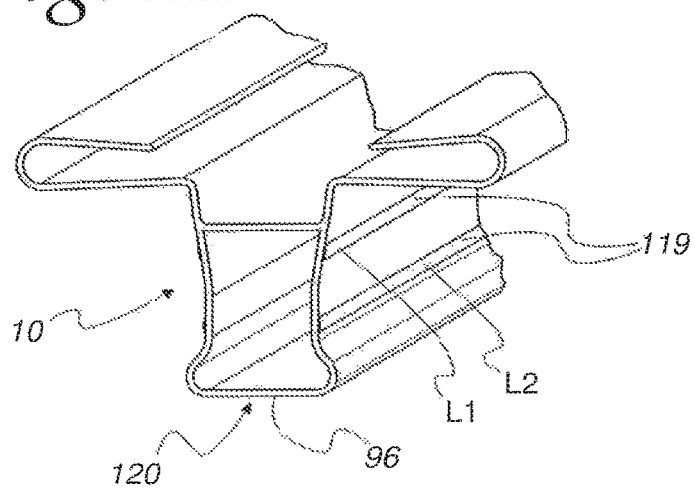
FIG. 12 is a fragmentary, perspective view of a modified form of protective sheath, according to the invention.
Figure 13:
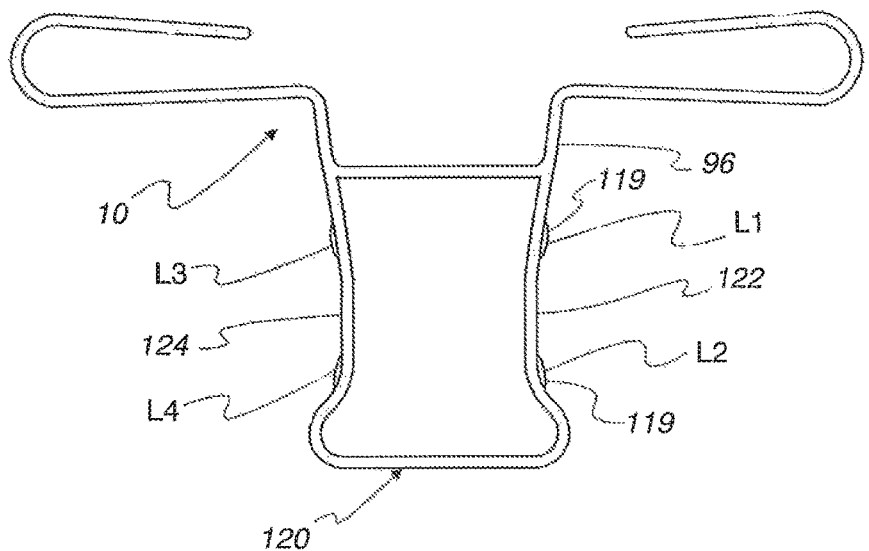
FIG. 13 is an end elevation view of the protective sheath in FIG. 12.

To facilitate gripping, a high-friction material 119 may be provided strategically on the rib 120, as shown in FIGS. 12 and 13. The high friction material may be provided, as in lengthwise strips, at one or more locations identified as L1, L2 on the wall 122 and L3, L4 on the wall 124.

With the body 96 extrusion formed, the high friction material may be incorporated through a co-extrusion molding process.

Alternatively, the high friction material might be otherwise applied, such as by an adhesive, using snap fit components, etc.

Figure 14:
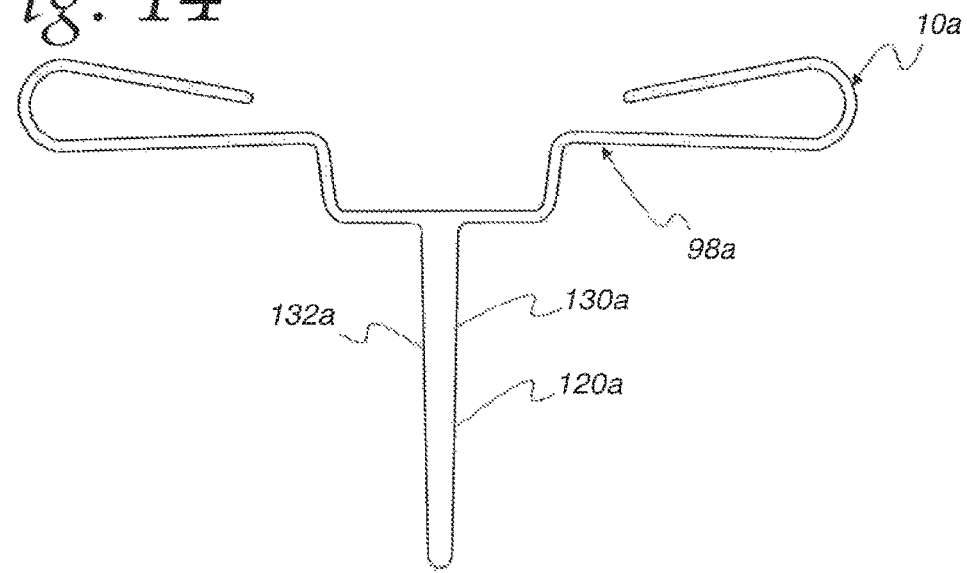
FIG. 14 is an end elevation view of a further modified form of protective sheath, according to the invention.

In a still further alternative form, a modified form of rib 120a might be utilized, as shown in FIG. 14. The rib 120a may be separately attached or extrusion formed with an engaging portion 98a having generally the same configuration as the engaging portion 98, described above. In this embodiment, the rib 120a has a solid construction that defines oppositely facing surfaces 130a, 132a that can be simultaneously grasped between a user's fingers to control the overall structure of the protective sheath 10a in the same manner as for the protective sheath 10. The solid rib construction is not a requirement, however.

The foregoing disclosure of specific embodiments is intended to be illustrative of the broad concepts comprehended by the invention.

The invention claimed is:

1. In combination:
   a) a cutting blade assembly having a length and comprising a frame and a first cutting blade member with at least a first cutting edge portion attached to the frame, the cutting blade assembly configured to cause relative movement between components on the cutting blade assembly that causes the at least first cutting edge portion to effect severance of an object; and
   b) a protective sheath,
   the cutting blade assembly and the protective sheath configured so that: i) the protective sheath can be moved relative to the cutting blade assembly between: A) a first separated position; and B) an assembled position wherein the protective sheath overlies at least a part of the cutting blade assembly so as to avoid unwanted contact with the at least first cutting edge portion; and ii) the protective sheath frictionally engages the cutting blade assembly to thereby be maintained in the assembled position as an incident of the protective sheath moving from the separated position into the assembled position,
   the protective sheath comprising at least one component that projects away from the cutting blade assembly with the protective sheath in the assembled position and has oppositely facing surfaces that can be grasped between two fingers on a user's one hand to facilitate repositioning of the protective sheath with the user's one hand,
   wherein the at least one component has a width between the oppositely facing surfaces and the width increases over at least a portion of the at least one component in a direction extending away from the cutting blade assembly with the protective sheath in the assembled position.

2. The combination according to claim 1 wherein the protective sheath is a single piece formed by an extrusion process.

3. The combination according to claim 1 wherein the protective sheath has a body with a length, and as viewed in cross section taken transversely to the body length the body defines an inside surface with a substantially oval shape that grips the cutting blade assembly with the protective sheath in the assembled position.

4. The combination according to claim 3 wherein the oval shape of the inside surface has a major axis, and the oval shape of the inside surface has a lengthwise void to receive a part of the cutting blade assembly.

5. The combination according to claim 4 wherein the at least one component comprises an elongate rib.

6. The combination according to claim 5 wherein the oppositely facing surfaces are defined on first and second wall portions that are spaced from each other.

7. The combination according to claim 3 wherein with the body viewed in cross section taken transversely to the body length the inside surface has a generally oval shape over substantially a full lengthwise extent of the body.

8. The combination according to claim 3 wherein the cutting blade assembly has a cutting portion with a free end and an opposite end spaced in a lengthwise direction, and spaced sides defining a part of a perimeter shape of the cutting blade assembly approximated by first and second substantially parallel lines spaced from each other a first distance and the inside surface of the body compressibly grips the cutting blade assembly with the protective sheath in the assembled position.

9. The combination according to claim 4 wherein the body has spaced lengthwise ends and the void extends fully between the spaced lengthwise ends of the body.

10. The combination according to claim 1 wherein the protective sheath is made from a non-metal material.

11. The combination according to claim 1 wherein the protective sheath has a body with a length and as viewed in cross section taken transversely to the body length, the body has a "T" shape with a cross bar and a stem with a free end.

12. The combination according to claim 1 wherein the protective sheath comprises two different materials formed by a co-extrusion process, at least one of the different materials exposed to be engaged by a user grasping the oppositely facing surfaces.

13. The combination according to claim 1 wherein the cutting blade assembly comprises a second cutting blade member with at least a second cutting edge portion, the cutting edge portions on the first and second cutting blade members cooperating to produce a scissors-type cutting action as at least one of the first and second cutting blade members is moved in a predetermined manner.

14. The combination according to claim 13 further in combination with a power source for moving the at least one of the first and second cutting blade members in the predetermined manner.

15. The combination according to claim 14 wherein the cutting blade assembly comprises a transmission unit for transmitting an operating force from the power source to the at least one of the first and second cutting blade members.

16. In combination:
a) a cutting blade assembly having a length and comprising a frame and a first cutting blade member with at least a first cutting edge, portion attached to the frame,
the cutting blade assembly configured to cause relative movement between components on the cutting blade assembly that causes the at least first cutting edge portion to effect severance of an object; and
b) a protective sheath,
the cutting blade assembly and the protective sheath configured so that: i) the protective sheath can be moved relative to the cutting blade assembly between: A) a first separated position; and B) an assembled position wherein the protective, sheath overlies at least a part of the cutting blade assembly so as to avoid unwanted contact with the at least first cutting edge portion; and ii) the protective sheath frictionally, engages the cutting blade assembly to thereby be maintained in the assembled position as an incident of the protective sheath moving from the separated position into the assembled position,
the protective sheath comprising at least one component that projects away from the cutting blade assembly with the protective sheath in the assembled position and has oppositely facing surfaces that can be grasped between two fingers on a user's one hand to facilitate repositioning of the protective sheath with the user's one hand,
wherein the protective sheath has a body with a length and as viewed in cross section taken transversely to the body length the body defines an inside surface with a substantially oval shape that grips the cutting blade assembly with the protective sheath in the assembled position,
wherein the oval shape of the inside surface has a major axis, and the oval shape of the inside surface has a lengthwise void to receive a part of the cutting blade assembly,
wherein the at least one component comprises an elongate rib,
wherein the oppositely facing surfaces are defined on first and second wall portions that are spaced from each other,
wherein the body has spaced third and fourth wall portions that each extend between the first and second wall portions.

17. In combination:
a) a cutting blade assembly having a length and comprising a frame and a first cutting blade member with at least a first cutting edge portion attached to the frame,
the cutting, blade assembly configured to cause relative movement between components on the cutting blade assembly that causes the at least first cutting edge portion to effect severance of an object; and
b) a protective sheath,
the cutting blade assembly and the protective sheath configured so that: i) the protective sheath can be moved relative to the cutting blade assembly between: A) a first separated position; and B) an assembled position wherein the protective sheath overlies at least a part of the cutting blade assembly so as to avoid unwanted contact with the at least first cutting edge portion; and ii) the protective sheath frictionally engages the cutting blade assembly to thereby be maintained in the assembled position as an incident of the protective sheath moving from the separated position into the assembled position,
the protective sheath comprising at least one component that projects away from the cutting blade assembly with the protective sheath n the assembled position and has oppositely facing surfaces that can be grasped between two fingers on a user's one hand to facilitate repositioning of the protective sheath with the user's one hand,
wherein with the cutting blade assembly in the assembled position, the oppositely facing surfaces each has a portion projecting away from the cutting blade assembly at least 1 inch.

18. In combination:
a) a cutting blade assembly having a length and comprising a frame and a first cutting blade member with at least a first cutting edge portion attached to the frame,
the cutting blade assembly configured to cause relative movement between components on the cutting blade assembly that causes the at least first cutting edge portion to effect severance of an object; and
b) a protective sheath,
the cutting blade assembly and the protective sheath configured so that: i) the protective sheath can be moved relative to the cutting blade assembly between: A) a first separated position; and B) an assembled position wherein the protective sheath overlies at least a part of the cutting blade assembly so as to avoid unwanted, contact with the at least first cutting edge portion; and ii) the protective sheath frictionally engages the cutting blade assembly to thereby be maintained in the assembled position as an incident of the protective sheath moving from the separated position into the assembled position,
the protective sheath comprising at least one component that projects away from the cutting blade assembly with the protective sheath in the assembled position and has oppositely facing surfaces that can be grasped between two fingers on a user's one hand to facilitate repositioning of the protective sheath with the user's one hand, wherein the protective sheath has a body with a length and as viewed in cross section taken transversely to the body length, the body has a "T" shape with a cross bar and a stem with a free end, wherein the stem has a width and the width of the stem is locally enlarged adjacent the free end of the stem.

19. The combination according to claim 18 wherein the oppositely facing surfaces are on the stem and diverge in a direction from the stem free end towards the cross bar.

* * * * *